N. T. EDSON.
Spoke-Setting Machine.
No. 221,402. Patented Nov. 11, 1879.
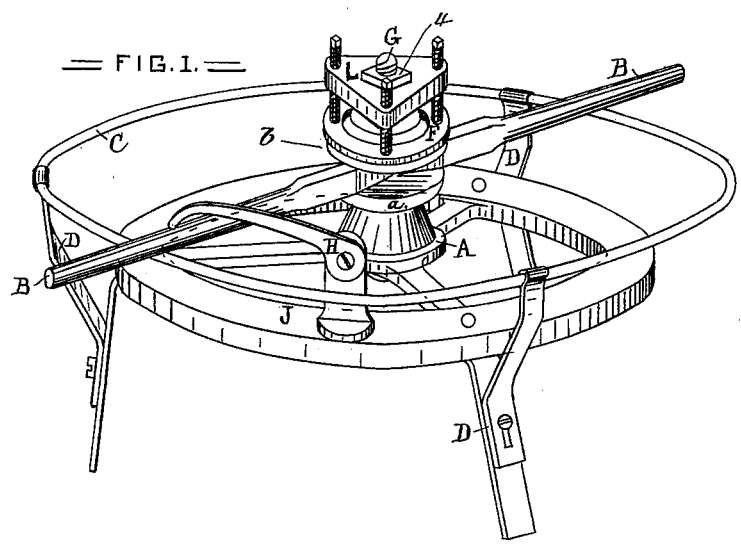
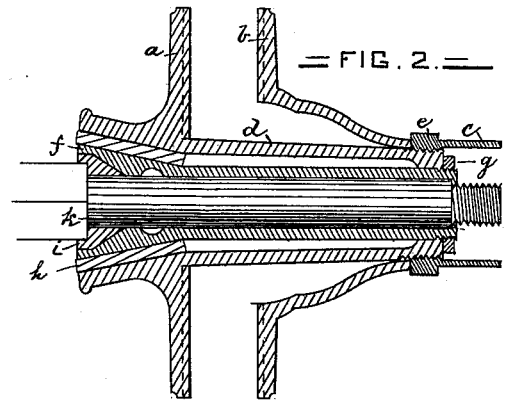

UNITED STATES PATENT OFFICE.

NATHANIEL T. EDSON, OF NEW ORLEANS, LOUISIANA.

IMPROVEMENT IN SPOKE-SETTING MACHINES.

Specification forming part of Letters Patent No. 221,402, dated November 11, 1879; application filed March 22, 1878.

*To all whom it may concern:*

Be it known that I, NATHL. T. EDSON, of New Orleans, State of Louisiana, have invented a new and useful Machine for Setting the Spokes in Carriage-Wheels, of which the following is a specification.

My invention relates to the making of that class of wheels which are constructed with metal hubs, in which hubs the nave ends of the spokes are confined between hub plates or flanges, one of which flanges is integral with the axle-box and the other removable from said box.

In the accompanying drawings, in which similar letters of reference indicate like parts, Figure 1 is a perspective of a stand embodying my invention. Fig. 2 is a sectional view of a metal hub susceptible of being used in the manufacture of wheels with my invention.

J and A are parts of the same casting, united by three arms extending from J to A, as shown, the top surfaces of which parts are turned true with each other. C is a circular rim resting on arms D. H is a gage, composed of two parts connected by a bolt and nut, and thereby adjustable, which rests on rim J, and is susceptible of being moved the entire circumference of the rim. F is a ring, which receives pressure from the set-screws that pass through block L. G is a bolt.

The hub, Fig. 2, is composed of flanges $a$ and $b$, box $d$, and nut or band $c$.

In operating my invention, the butt part of the hub, the end of which is turned true with its bore, is placed down on the stand at A. All of the spokes B that the wheel is to contain are placed on flange $a$, with their outer ends resting on circular rim C, which rim is adjusted to hold the spokes at a less elevation than their final position, the spokes having been formed with radial faces at their nave ends, so that the adjacent sides of the hub ends of the series of spokes match or fit tightly together. Flange $b$ is placed on the spokes and ring F on the flange. The band $c$ is screwed on box $d$, and a wrench placed on wrench-head $e$, formed on band $c$. Block L is placed over ring F, with its screws resting on the ring. Bolt G is placed up through the central part of the stand, box $d$, and block L, with a nut screwed on its end. The set-screws are turned down on the ring F, the spokes driven hard against each other, being guided to a proper and uniform elevation by use of gage H, the point of which gage, having been placed at a proper elevation, is held firm in such position by tightening the nut on its bolt, which gage rests on rim J detached, and is moved from spoke to spoke as they are being driven, the outer ends of the spokes being held to the same elevation as the point of the gage. After the spokes are thus driven, band $c$ is turned hard down on flange $b$. After removing the hub and spokes thus connected from the stand, bolts may be inserted through the spokes and flanges.

What I claim is—

In a spoke-setting machine, a circular platform having the form of a wheel, and supported by legs, to each of which a ring-supporting arm is adjustably attached, in combination with a clamp-block having three pressure and leveling screws passing through the same, and a bolt adapted to pass through the center of the platform, the hub, and the clamp-block, and a nut for clamping said parts together, substantially as shown and described.

NATHL. T. EDSON.

Witnesses:
J. M. WEYMOUTH,
J. N. MÜLLER.